United States Patent
Koiwai et al.

(10) Patent No.: US 6,795,252 B2
(45) Date of Patent: Sep. 21, 2004

(54) LENS BARREL

(75) Inventors: Tamotsu Koiwai, Tokyo (JP); Ai Midorikawa, Saitama (JP)

(73) Assignee: Olympus Corporation (JP)

( * ) Notice: Subject to any disclaimer, the term of this patent is extended or adjusted under 35 U.S.C. 154(b) by 344 days.

(21) Appl. No.: 10/114,306

(22) Filed: Apr. 1, 2002

(65) Prior Publication Data

US 2002/0171948 A1 Nov. 21, 2002

(30) Foreign Application Priority Data

May 15, 2001 (JP) ........................................ 2001-145302

(51) Int. Cl.[7] .............................................. G02B 15/14
(52) U.S. Cl. ....................... 359/704; 359/699; 359/700; 359/701
(58) Field of Search ................................ 359/699, 700, 359/701, 704, 694

(56) References Cited

U.S. PATENT DOCUMENTS

| | | | | |
|---|---|---|---|---|
| 6,198,578 B1 | * | 3/2001 | Iwasa et al. | 359/699 |
| 6,373,641 B2 | * | 4/2002 | Koiwai | 359/700 |
| 6,487,025 B2 | * | 11/2002 | Koiwai et al. | 359/699 |
| 6,570,718 B2 | * | 5/2003 | Nomura et al. | 359/699 |
| 6,570,719 B2 | * | 5/2003 | Koiwai et al. | 359/704 |

FOREIGN PATENT DOCUMENTS

JP          58-118612          7/1943

* cited by examiner

Primary Examiner—Loha Ben
(74) Attorney, Agent, or Firm—Ostrolenk, Faber, Gerb & Soffen, LLP (57) ABSTRACT

For a camera lens barrel with helicoid threads, at the portion where the helicoid female thread of a fixed frame is threaded with the helicoid male thread of a rotary frame, six separation preventing pins are implanted in the portion of the helicoid male thread around the same circumference at the equal intervals. These separation presenting pins are implanted between convex thread portions of the helicoid male thread, respectively. Protruding portions of the separation preventing pins fit in and slidingly contact concave thread portions of the helicoid female thread that is threaded with the helicoid male thread in which the separation preventing pins are disposed. A contacting edge fits in and comes into sliding contact with the concave thread portion of the helicoid female thread by narrowing the circumferential surface thereof. An edge is formed around the shaft portion of each separation preventing pin, which is implanted in the rotary frame, at a position near to the end thereof by narrowing the circumferential surface of the shaft portion.

22 Claims, 5 Drawing Sheets

LENS BARREL

This application claims benefit of Japanese Patent Application No. 2001-145302 filed on May 15, 2001, the contents of which are incorporated by this reference.

BACKGROUND OF THE INVENTION

1. Field of the Invention

The present invention relates to a lens barrel of a camera, and the like, in which the lens barrel has a plurality of lens frames moving in an optical axis direction and firmly couples the lens frames with each other.

2. Description of the Related Art

Conventionally, lens frames of a lens barrel used in cameras, and the like, are often coupled with each other through helicoid threads so that they relatively move in an optical axis direction smoothly.

As a conventional method of coupling lens frames by helicoid threads, Japanese Unexamined Patent Application Publication No. 58-118612, for example, discloses a technology for eliminating not only backlash in rear gap but also backlash in radial engagement by engaging a roller, which fits in a roller shaft, with the one side surface of a helicoid thread of one of lens frames.

In the lens barrel arranged as described above, when a user drops a camera by mistake or when some kind or another shock or hit is applied to the camera, there is a possibility that a large amount of force is applied to the coupling portion between the lens frames.

In this accident, when external force acts in a direction where respective helicoid threads, which are threaded to each other, are released, it is necessary to prevent the helicoid threads from being easily released from each other to keep the coupling between the respective lens frames.

However, the above example of the conventional art intends to eliminate the backlash in rear gap and in radial engagement and has not a function for preventing the release of threaded helicoid threads. That is, since the shape of the roller is formed according to the shape of one of the helicoid threads on which the roller is abutted, a problem arises in that the roller is also disengaged from the helicoid thread similarly to the portion of the other helicoid thread.

Accordingly, it is an object of the present invention, which was made in view of the above circumstances, to provide a lens barrel that couples lens frames with each other making use of helicoid threads and that can keep the lens frames in a firmly coupled state even if unintentional external force is applied to the lens barrel.

SUMMARY OF THE INVENTION

A lens barrel includes a first frame having a helicoid female thread and a second frame having a helicoid male thread that is threaded with the helicoid female thread, and a pin member is disposed in any one of the first frame and the second frame. The pin member fits in the helicoid thread that is threaded with the helicoid thread of the frame in which the pin member is disposed, has a sliding contact surface that comes into sliding contact with the flank surface of the helicoid thread in which the pin member fits, and has an edge, which can bite into the flank surface of the helicoid thread, at the end of the sliding contact surface thereof.

The above and other objects, features and advantages of the invention will become more clearly understood from the following description referring to the accompanying drawings.

DETAILED DESCRIPTION OF PREFERRED EMBODIMENTS

A first embodiment of the present invention will be described with reference to FIGS. 1 to 5.

Figure 1:
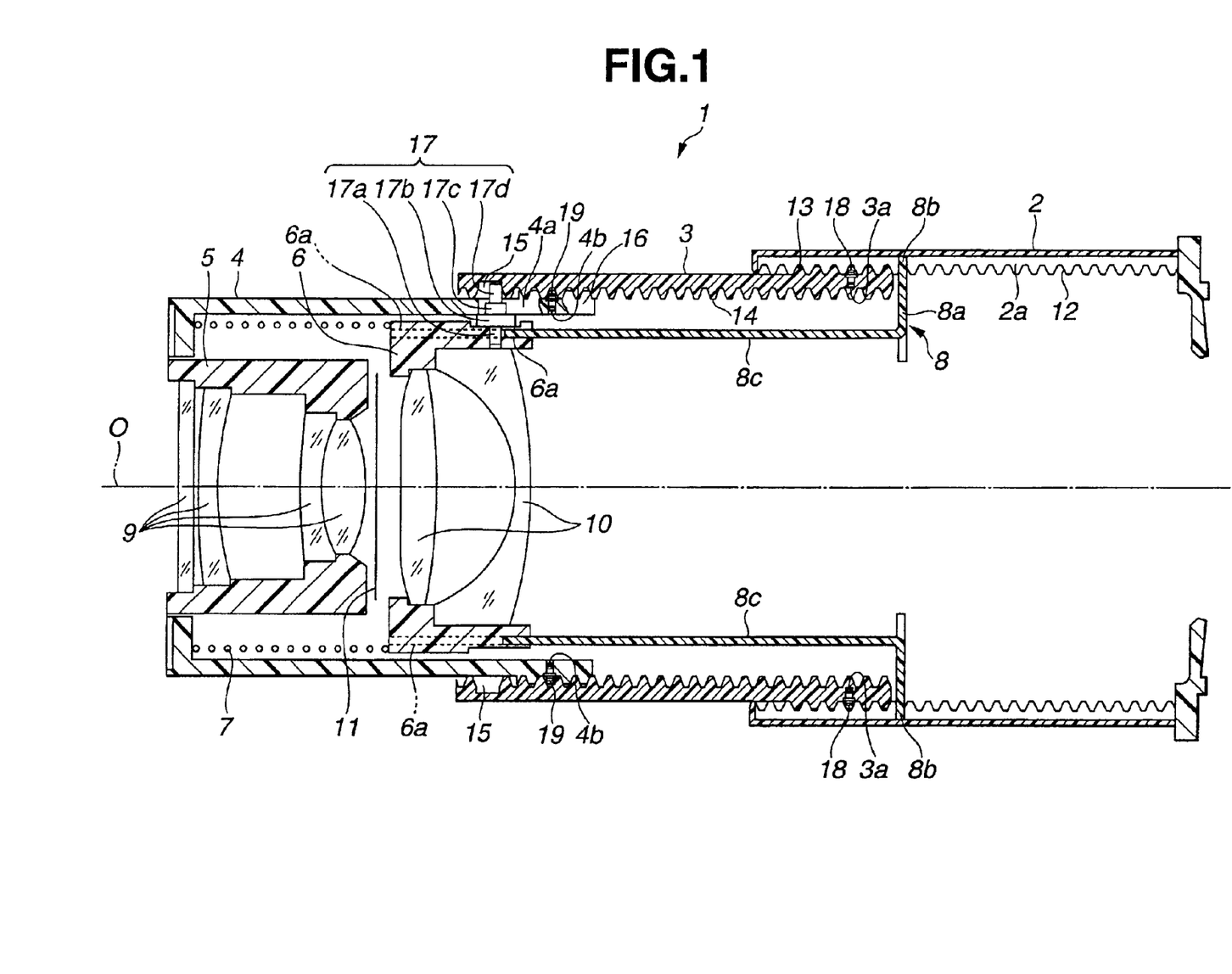
FIG. 1 is a longitudinal sectional view of a lens barrel of a first embodiment of the present invention taken along the optical axis thereof.

In FIG. 1, reference numeral 1 denotes a lens barrel. The lens barrel 1 can perform zooming and is composed of a fixed frame 2, a rotary frame 3, a zoom frame 4, a first group frame 5, a second group frame 6, and a linear-movement key 8. The fixed frame 2 is fixed to a camera main body (not shown) or the like; the rotary frame 3 is supported so as to rotate as well as to advance and retract with respect to the fixed frame 2 and is driven in rotation by a lens frame drive unit (not shown); the zoom frame 4 is supported by the rotary frame 3 so as to rotate as well as to advance and retract relatively to the rotary frame 3; the first group frame 5 holds a first lens group 9; and the second group frame 6 holds a second lens group 10 and a shutter 11.

The fixed frame 2 has a helicoid female thread 12 formed around the inner circumferential surface thereof as well as has a linear-movement guide groove 2a formed thereon to guide the linear movement of the linear-movement key 8 in an optical axis O direction.

The rotary frame 3 has a helicoid male thread 13, which is threaded with the helicoid female thread 12, around the outer circumferential surface at the rear end thereof (on the side close to the camera main body) as well as has a helicoid female thread 14 formed around the inner circumferential surface thereof.

Further, the rotary frame 3 has a plurality of (for example, three) cam grooves 15 that are formed around the inner circumferential surface so as to be oblique to the optical axis direction. When the rotary frame 3 is driven in rotation by the lens frame drive unit (not shown), it extends from a collapsed position to a predetermined photographing position while rotating with respect to the fixed frame 2.

The linear-movement key 8 includes a projecting unit 8b and a key unit 8c. The projecting unit 8b projects in a circumferential direction from the base end portion 8a of the linear-movement key 8 and is slidably inserted into the linear-movement guide groove 2a of the fixed frame 2. The key unit 8c extends forward from the base end portion 8a through the lens barrel 1 and linearly guides the second group frame 6 directly so that it cannot be rotated.

The linear-movement key 8 advances and retracts in the optical axis direction integrally with the rotary frame 3 while the rotary frame 3 rotates relatively to the linear-movement key 8 in a state in which the linear-movement key 8 is guided by a known support mechanism so as to move linearly without rotating with respect to the fixed frame 2.

The zoom frame 4 is formed in a cylindrical shape and has a helicoid male thread 16 formed around the outer circumferential surface at the rear end thereof so as to be threaded with the helicoid female thread 14 of the rotary frame 3. The zoom frame 4 has a guide groove 4a formed at the rear end of the cylindrical portion thereof, and the guide groove 4a passes through the zoom frame 4 slenderly from the rear end thereof along the optical axis direction.

The first group frame 5 is accommodated in and secured to the inside of the zoom frame 4 at the front end thereof. With this arrangement, when the rotary frame 3 is rotated, the zoom frame 4 can advance and retract relatively to the rotary frame 3 because the zoom frame 4 is regulated not to rotate by the three cam followers 17 of the second frame group 6 through the guide groove 4a and is guided to move linearly. These cam followers 17 are disposed around the same outside circumferential surface of the second frame group 6 at substantially the same intervals.

The second frame group 6 has a key groove 6a into which the key unit 8c of the linear-movement key 8 is slidably inserted. An urging spring 7, which is a compressed spring, is inserted between the extreme end surface of second frame group 6 and the inner extreme end surface of the zoom frame 4 and is urged at all times in a direction where the extreme end surface of the second frame group 6 is separated from the inside of the extreme end surface of the zoom frame 4. The second frame group 6 is guided by the linear-movement key 8 so as to move linearly and is moved back and forth relatively to the rotary frame 3 by the cam followers 17 that move along the cam grooves 15 of the rotary frame 3.

Each of the three cam followers 17 is formed in a three-stepped shape and has a shaft portion 17a, an optical axis adjusting portion 17b, a linear movement guide sliding contact portion 17c, and a cam groove sliding contact portion 17d each having a different diameter. The shaft portion 17a is implanted in, for example, a mounting hole of the zoom frame 4 so as to be optionally removed therefrom; the optical axis adjusting portion 17b is formed in a predetermined thickness to adjust the gap between the inside surface of the zoom frame 4 and the outside surface of the second frame group 6 (the optical axis of the second lens group 10); the linear movement guide sliding contact portion 17c is arranged such that the side surface thereof is engaged and comes into sliding contact with the guide groove 4a of the zoom frame 4; and the cam groove sliding contact portion 17d is arranged such that the side surface thereof is engaged and comes into sliding contact with the cam grooves 15 of the rotary frame 3.

Next, the threading portion between the helicoid female thread 12 of the fixed frame 2 and the helicoid male thread 13 of the rotary frame 3 will be described in detail.

Figure 2:
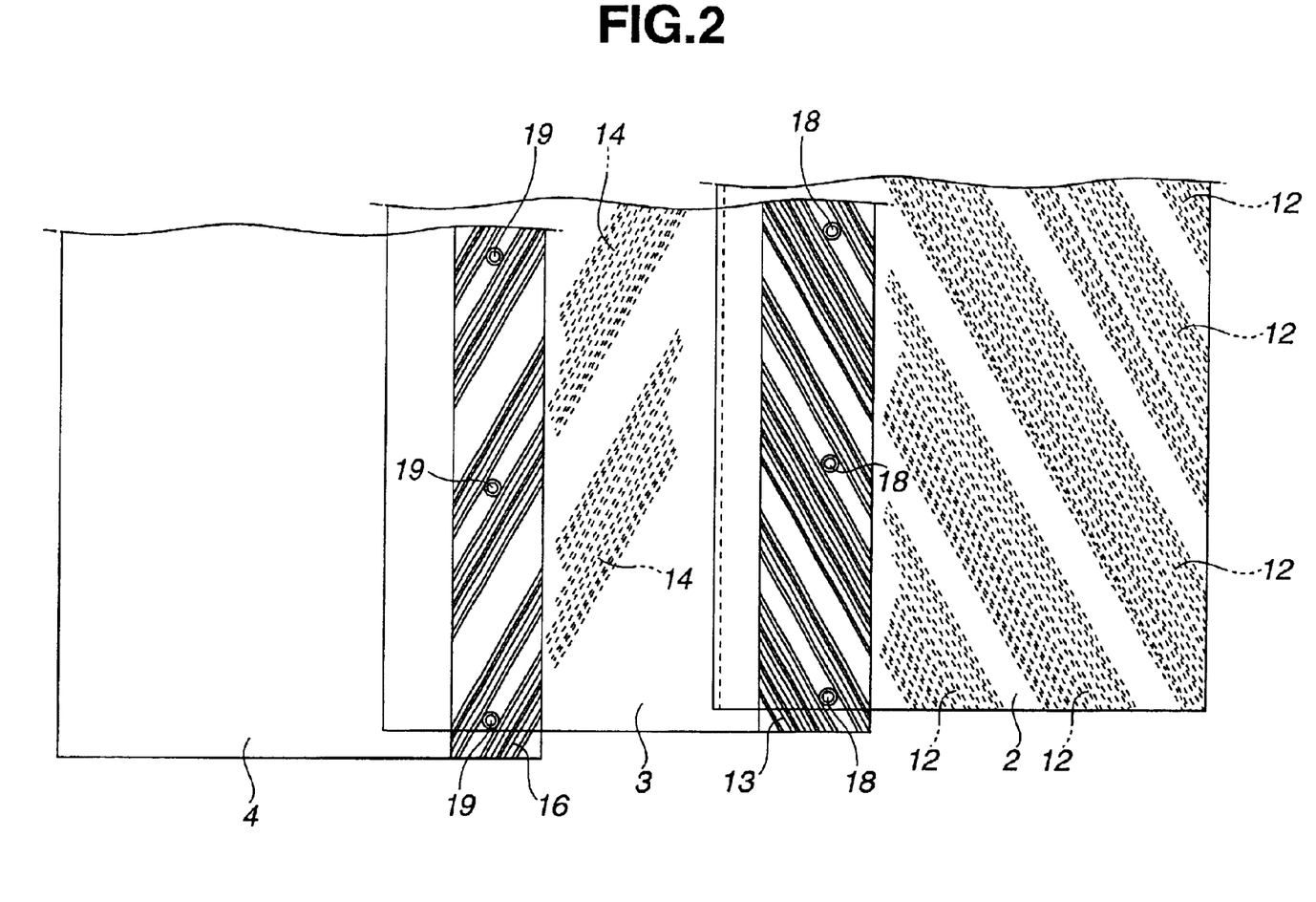
FIG. 2 is a developed elevational view schematically showing the helicoid threads of respective lens frames and the positions of separation preventing pins according to the first embodiment of the present invention.

As shown in FIG. 2, the helicoid female thread 12 of the fixed frame 2 is formed as an ordinary helicoid female thread.

In contrast, six separation preventing pins 18 acting as pin members (three pins are shown FIG. 2) are implanted in the portion of the helicoid male thread 13 of the rotary frame 3 around the same circumference thereof at the same intervals. These separation preventing pins 18 are formed of a metal material and are implanted between convex thread portions of the helicoid male thread 13, respectively. That is, the separation preventing pins 18 are implanted in concave thread portions of the helicoid male thread 13.

Then, the portion of each separation preventing pin 18, which protrudes to the outside between the convex thread portions of the helicoid male thread 13, fits in and comes into sliding contact with the concave thread portion of the helicoid female thread 12 to be threaded with the helicoid male thread 13.

Figure 3:
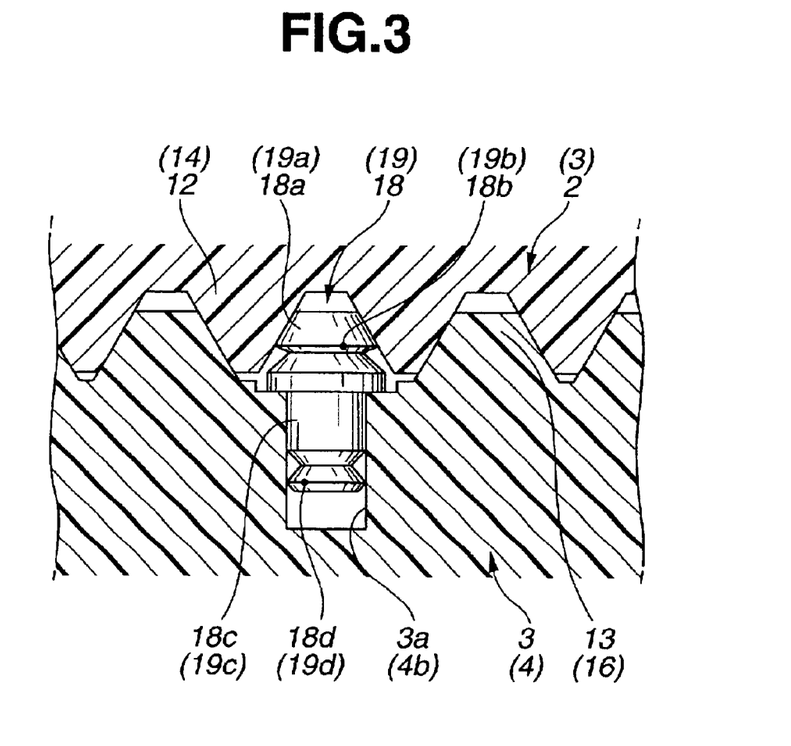
FIG. 3 is an enlarged sectional view explaining a planted separation preventing pin according to the first embodiment of the present invention.

That is, as shown in FIG. 3, the sliding contact portion 18a of the separation preventing pin 18, which fits in and comes into sliding contact with the concave thread portion of the helicoid female thread 12 is formed as if it is composed of only the base side portion of a circular cone whose diameter is gradually increased according to approximately the angle of the concave thread portion of the helicoid female thread 12. Further, the separation preventing pin 18 has an edge 18b formed at approximately the center of the sliding contact portion 18a thereof. The edge 18b is formed by narrowing the circumferential surface of the sliding contact portion 18a and is located on the flank surface of the helicoid female thread 12.

Further, the separation preventing pin 18 is implanted by inserting the shaft portion 18c thereof projecting from the sliding contact portion 18a into a hole 3a formed in the rotary frame 3. The separation preventing pin 18 has an edge 18d formed at the end side of the shaft portion 18c by narrowing the circumferential surface thereof.

As a result, even if some kind or another external force, for example, is applied to the coupling portion where the fixed frame 2 is coupled with the rotary frame 3 through the helicoid threads in a direction where the helicoid female thread 12 is separated from the helicoid male thread 13, the edge 18b of the separation preventing pin 18 is caught by the surface of the helicoid female thread 12, that is, by the flank surface of the helicoid female thread 12, which effectively prevents the separation of the helicoid female thread 12 from the helicoid male thread 13.

Further, even if force in a direction where the helicoid female thread 12 is separated from the helicoid male thread 13 acts in a direction where the shaft portion 18c of the separation preventing pin 18 is extracted from the hole 3a formed in the rotary frame 3, the extraction of the shaft portion 18c of the separation preventing pin 18 from the hole 3a can be effectively prevented because the edge 18d of the shaft portion 18c is caught by the surface of the hole 3a.

Further, the sliding contact portion 18a of the separation preventing pin 18 also has a role for suppressing the occurrence of various types of backlash between the helicoid female thread 12 and the helicoid male thread 13 because the sliding contact portion 18a fits in and comes into sliding contact with the concave thread portion of the helicoid female thread 12.

As described above, in the first embodiment of the present invention, the fixed frame 2 is arranged as a first frame and the rotary frame 3 is arranged as a second frame at the portion where the helicoid female thread 12 of the fixed frame 2 is coupled with the helicoid male thread 13 of the rotary frame 3 through the helicoid threads.

Next, the threading portion between the helicoid female thread 14 of the rotary frame 3 and the helicoid male thread 16 of the zoom frame 4 will be described in detail. The coupling of the rotary frame 3 with the zoom frame 4 through the helicoid threads is arranged substantially similarly to the coupling of the fixed frame 2 with the rotary frame 3 through the helicoid threads. As shown in FIG. 2, the helicoid female thread 14 of the rotary frame 3 is arranged as an ordinary helicoid thread.

In contrast, six separation preventing pins 19 acting as pin members (three pins are shown FIG. 2) are implanted in the portion of the helicoid male thread 16 of the zoom frame 4 around the same circumference thereof at the same intervals. These separation preventing pins 19 are formed of a metal material and are implanted between convex thread portions of the helicoid male thread 16, respectively. That is, the separation preventing pins 19 are implanted in concave thread portions of the helicoid male thread 16.

Then, the portion of each separation preventing pin 19, which protrudes to the outside between the convex thread portions of the helicoid male thread 16, fits in and comes into sliding contact with the concave thread portion of the helicoid female thread 14 that is threaded with the helicoid male thread 16.

That is, as shown in FIG. 3, the sliding contact portion 19a of the separation preventing pin 19, which fits in and comes into sliding contact with the concave thread portion of the helicoid female thread 14 is formed as if it is composed of only the base side portion of a circular cone whose diameter is gradually increased according to approximately the angle of the concave thread portion of the helicoid female thread 14. Further, the separation preventing pin 19 has an edge 19b formed at approximately the center of the sliding contact portion 19a thereof. The edge 19b is formed by narrowing the circumferential surface of the sliding contact portion 19a and is located on the flank surface of the helicoid female thread 14.

Further, the separation preventing pin 19 is implanted by inserting the shaft portion 19c thereof projecting from the sliding contact portion 19a into a hole 4b formed in the zoom frame 4. The separation preventing pin 19 has an edge 19d formed on the end side of the shaft portion 19c by narrowing the circumferential surface thereof.

As a result, even if some kind or another external force, for example, is applied to the coupling portion where the rotary frame 3 is coupled with the zoom frame 4 through the helicoid threads in a direction where the helicoid female thread 14 is separated from the helicoid male thread 16, the edge 19b of the separation preventing pin 19 is caught by the surface of the helicoid female thread 14, that is, by the flank surface of the helicoid female thread 14, which effectively prevents the separation of the helicoid female thread 14 from the helicoid male thread 16.

Further, even if force in a direction where the helicoid female thread 14 is separated from the helicoid male thread 16 acts in a direction where the shaft portion 19c of the separation preventing pin 19 is extracted from the hole 4b formed in the zoom frame 4, the extraction of the shaft portion 19c of the separation preventing pin 19 from the hole 4b can be effectively prevented because the edge 19d of the shaft portion 19c is caught by the surface of the hole 4b.

Further, the sliding contact portion 19a of the separation preventing pin 19 also has a role for suppressing the occurrence of various types of backlash between the helicoid female thread 14 and the helicoid male thread 16 because the sliding contact portion 19a fits in and comes into sliding contact with the concave thread portion of the helicoid female thread 14.

As described above, in the first embodiment of the present invention, the rotary frame 3 is arranged as a first frame and the zoom frame 4 is arranged as a second frame at the portion where the helicoid female thread 14 of the rotary frame 3 is coupled with the helicoid male thread 16 of the zoom frame 4 through the helicoid threads.

Figure 4:
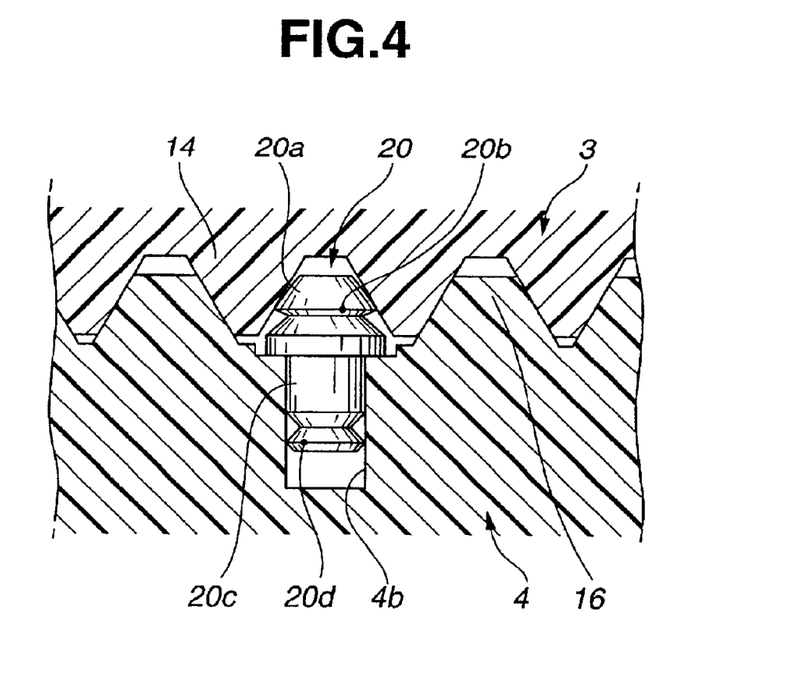
FIG. 4 is an enlarged sectional view explaining a planted separation preventing pin of an example, which is different from that shown in FIG. 3, according to the first embodiment of the present invention.

Further, even if the separation preventing pins 18 and 19 are formed in a shape as shown in FIG. 4 that is different from that shown in FIG. 3, an effect similar to the above effect can be obtained.

That is, when a separation preventing pin 20 shown in FIG. 4 is employed in, for example, the threading portion between the helicoid female thread 14 of the rotary frame 3 and the helicoid male thread 16 of the zoom frame 4, the sliding contact portion 20a of the separation preventing pin 20, which fits in and comes into contact with the concave thread portion of the helicoid female thread 14 is formed as if it is composed of only the base side portion of a circular cone whose diameter is gradually increased at an angle larger than approximately the angle of the concave thread portion of the helicoid female thread 14.

Further, the separation preventing pin 20 has an edge 20b formed at substantially the center of the sliding contact portion 20a thereof by narrowing the circumferential surface thereof. With this arrangement, only the portion of the separation preventing pin 20, which is located in the vicinity of the edge 20b of the sliding contact portion 20a, fits in and comes into sliding contact with the concave thread portion of the helicoid female thread 14 that is threaded with the helicoid male thread 16.

Further, the separation preventing pin 20 is implanted by inserting the shaft portion 20c thereof projecting from the sliding contact portion 20a into a hole 4b formed in the zoom frame 4, similarly to the separation preventing pin 19. The separation preventing pin 20 has an edge 20d formed on the end side of the shaft portion 20c by narrowing the circumferential surface thereof.

As a result, even if some kind or another external force, for example, is applied to the coupling portion where the rotary frame 3 is coupled with the zoom frame 4 through the helicoid threads in a direction where the helicoid female thread 14 is separated from the helicoid male thread 16, the edge 20b of the separation preventing pin 20 is caught by the surface of the helicoid female thread 14, which effectively prevents the separation of the helicoid female thread 14 from the helicoid male thread 16.

Even if force in a direction where the helicoid female thread 14 is separated from the helicoid male thread 16 acts in a direction where the shaft portion 20c of the separation preventing pin 20 is extracted from the hole 4b formed in the zoom frame 4, the extraction of the shaft portion 20c of the separation preventing pin 20 from the hole 4b can be effectively prevented because the edge 20d of the shaft portion 20c is caught by the surface of the hole 4b.

The sliding contact portion 20a of the separation preventing pin 20 also has a role for suppressing the occurrence of various types of backlash between the helicoid female thread 14 and the helicoid male thread 16 because the sliding contact portion 20a fits in and comes into sliding contact with the concave thread portion of the helicoid female thread 14 in the vicinity of the edge 20b.

Figure 5:
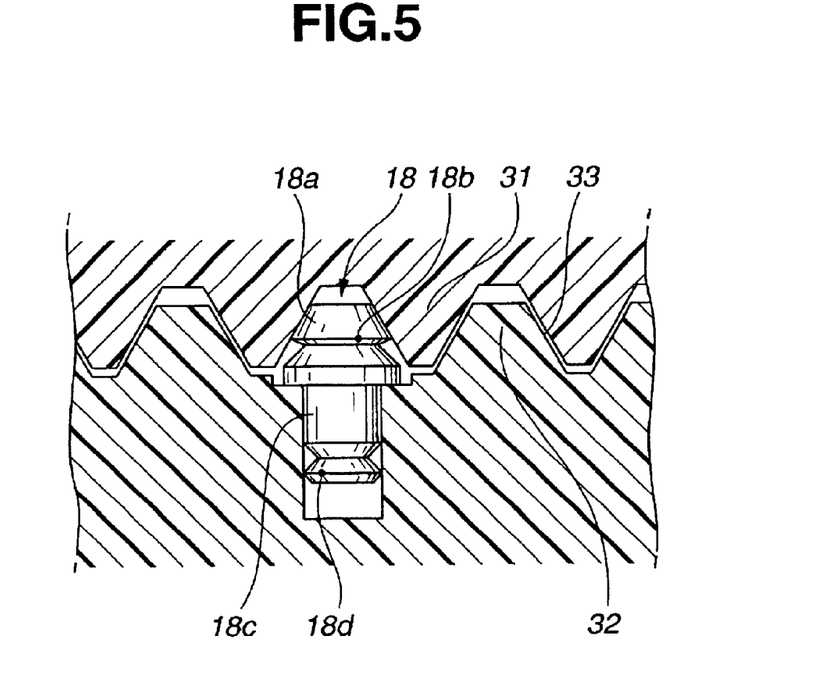
FIG. 5 is an enlarged sectional view explaining a planted separation preventing pin of an example, which is different from those shown in FIGS. 3 and 4, according to the first embodiment of the present invention.

Further, even if the separation preventing pins 18, 19, and 20 are used in such a manner shown in FIG. 5 that is different from those shown in FIGS. 3 and 4, an effect similar to the above effects can be obtained. Here, a case, in which the separation preventing pin 18 is used in the threading portion where a helicoid female thread 31 is threaded with a helicoid male thread 32, will be described. The helicoid female thread 31 and the helicoid male thread 32 can be employed to couple the fixed frame 2 with the rotary frame 3 therethrough or to couple the rotary frame 3 with the zoom frame 4 therethrough.

The helicoid female thread 31 is threaded with the helicoid male thread 32 with a slight gap 33 defined therebetween. The gap 33 is caused by a dimensional error due to deformation-and contraction in molding (injection molding) and is set to a minimum mount necessary to obtain smooth sliding.

Six separation preventing pins 18 are implanted between convex thread portions of the helicoid male thread 32 around the same circumference thereof at equal intervals, respectively. The sliding contact portions 18a of the separation preventing pins 18 fit in and come into sliding contact with the concave thread portions of the helicoid female thread 31 that is threaded with the helicoid male thread 32.

That is, while there is a possibility that the backlash of lens frames due to the gap 33 causes defocusing and a decrease in a lens capability due to decentering, the backlash can be minimized by fitting the separation preventing pins 18 in the concave thread portions of the helicoid female thread 31 that is threaded with the helicoid male thread 32, respectively and by causing the separation preventing pins 18 to come into sliding contact therewith.

Even if some kind or another external force is applied to the coupling portion where the helicoid female thread 31 is coupled with the helicoid male thread 32 in a direction where the helicoid female thread 31 is separated from the helicoid male thread 32 also in this case, as described above, the edge 18b of each separation preventing pin 18 is caught by the surface of the helicoid female thread 31, which effectively prevents the separation of the helicoid female thread 31 from the helicoid male thread 32.

Further, even if force in a direction where the helicoid female thread 31 is separated from the helicoid male thread 32 acts in a direction where the shaft portion 18c of each separation preventing pin 18 is extracted from the hole into which it is implanted, the extraction of the shaft portion 18c from the hole can be effectively prevented because the edge 18d of the shaft portion 18c is caught by the surface of the hole.

As described above, any one of the shapes of the separation preventing pin 18, 19, and 20 can be appropriately and selectively used as the shape of a separation preventing pin used in the coupling made by the helicoid threads, thereby a similar effect can be obtained. Further, even if the gap 33 exists in the portion where the helicoid threads are coupled with each other, a sufficient separation preventing effect can be obtained by fitting the separation preventing pins 18, 19, or 20 in the concave thread portions of the corresponding helicoid female thread and by causing them to come into sliding contact therewith, respectively.

Next, a second embodiment of the present invention will be described with reference to FIG. 6.

That is, the first embodiment shows the examples in which the separation preventing pins 18, 19, and 20 are disposed in the helicoid male thread. In contrast, in the second embodiment, the separation preventing pins 18, 19, and 20 are disposed in the helicoid female thread.

Figure 6:
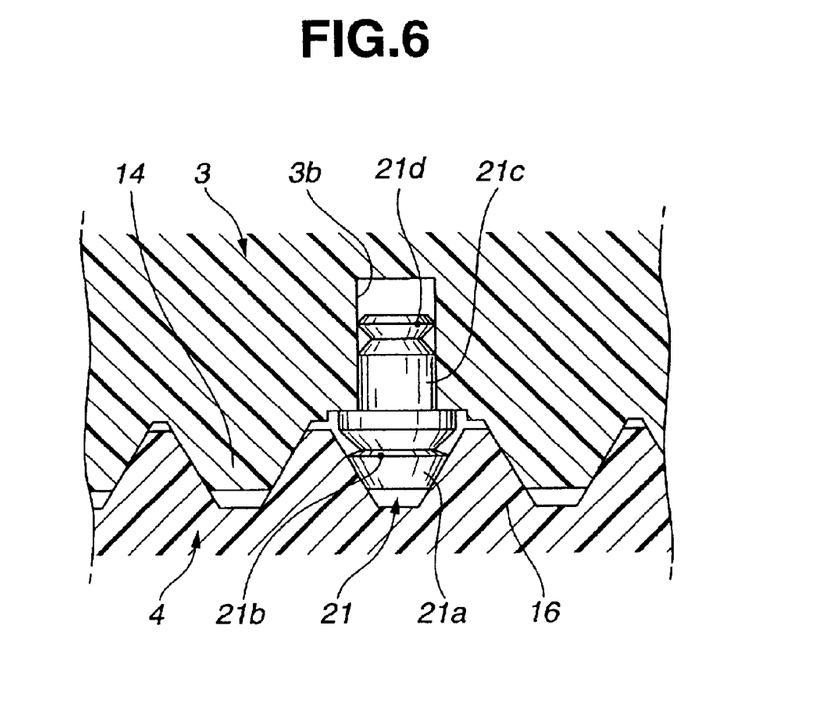
FIG. 6 is an enlarged sectional view explaining a planted separation preventing pin according to a second embodiment of the present invention.

In FIG. 6, the separation preventing pin 18 or 19, for example, of the separation preventing pins 18, 19, and 20 in the first embodiment is disposed between convex thread portions of the helicoid female thread 14, that is, in a concave thread portion thereof. In a separation preventing pin 21 disposed as described above, the shaft portion 21c thereof is implanted in a hole 3b formed in the rotary frame 3 having the helicoid female thread 14. When external force is applied to a lens frame, a ring-shaped edge 21d formed around the circumference of the shaft portion 21c can bite in the inner circumferential surface of the hole 3b, similarly to the first embodiment.

Further, a ring-shaped edge 21b, which can be bitten in the flank surface of the helicoid male thread 16 of the zoom frame 4, is formed on the taper surface 21a of the separation preventing pin 21. The function of the edge 21b is approximately similar to that of the first embodiment.

Note that it goes without saying that an effect similar to that of the first embodiment, in which the separation preventing pin 20 is used, can be obtained also in the second embodiment when the separation preventing pin 20 is used therein the sliding contact portion 20a of which fits in and comes into sliding contact with the concave thread portion of the helicoid thread and is formed as if it is composed of only the base side portion of a circular cone whose diameter is gradually increased at an angle larger than approximately the angle of the convex thread portion of the helicoid thread.

Further, even if the helicoid female thread is threaded with the helicoid male thread with a slight gap defined therebetween in the second embodiment, as described in the first embodiment, backlash caused by the gap can be minimized by fitting the separation preventing pins 21 in the concave thread portions of the corresponding helicoid male thread and by causing the separation preventing pins 21 to come into slide contact therewith, respectively, as described in the first embodiment.

Figure 7:
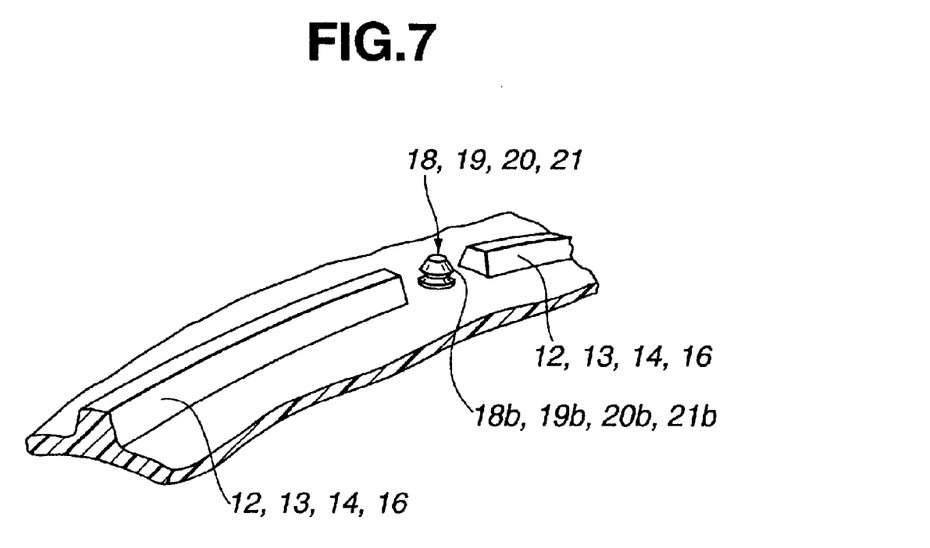
FIG. 7 is a perspective view explaining the vicinity of the outside appearance of a planted separation preventing pin according to a third embodiment of the present invention.
Figure 8:
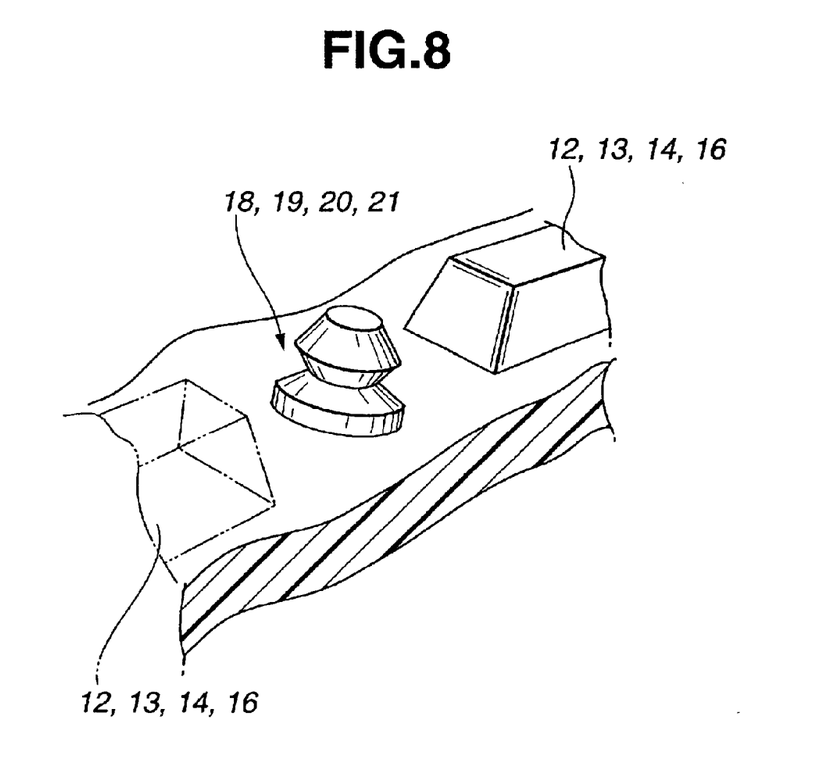
FIG. 8 is an enlarged perspective view showing the vicinity of the outside appearance of the planted separation preventing pin according to the third embodiment of the present invention.

Next, a third embodiment of the present invention will be described with reference to FIGS. 7 and 8.

That is, a convex thread portion, which is threaded with a corresponding helicoid thread, is not formed in the portion, in which the separation preventing pin 18, 19, 20, or 21 is disposed, between convex thread portions of a helicoid thread in the first and second embodiments. In contrast, in the third embodiment, the separation preventing pin 18, 19, 20, or 21 is disposed at a midpoint in a convex thread string 12, 13, 14, or 16 of a helicoid thread, as shown in FIGS. 7 and 8. That is, a portion without a convex thread portion is formed at the midpoint in the convex thread string 12, 13, 14, or 16 of the helicoid thread so as to interrupt the convex thread string, and the separation preventing pin 18, 19, 20, or 21 is implanted in the above portion interrupting the convex thread string.

With this arrangement, even if the convex thread string 12, 13, 14, and 16 of the helicoid thread is deformed slightly by external force applied to lens frames, the lens frames are unlikely to be separated from each other. This is because that when the separation preventing pins 18, 19, 20, and 21 are made of a material harder than the convex thread strings 12, 13, 14, and 16 formed of synthetic resin, that is, when separation preventing pins are made of, for example, steel, brass, or the like, the edges 18b, 19b, 20b, and 21b of the taper portions of the separation preventing pins bite in the flank surface of a corresponding helicoid thread.

Note that while the separation preventing pins 18, 19, 20, and 21 are engaged with the helicoid thread itself in the respective embodiments described above, a groove wider than the helicoid thread may be formed in parallel with the helicoid thread.

As described above, according the present invention, even if unintentional external force is applied to the lens barrel, the lens frames, which are coupled with each other through the helicoid threads, can be maintained in a firmly coupled state.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A lens barrel comprising:
a first frame including a helicoid female thread;
a second frame including a helicoid male thread that is threaded with the helicoid female thread; and
a pin member disposed in any one of the first frame and the second frame,
wherein the pin member fits in the helicoid thread that is threaded with the helicoid thread of the frame in which the pin member is disposed, has a sliding contact surface that comes into sliding contact with the flank surface of the helicoid thread in which the pin member fits, and has an edge, which can bite into the flank surface of the helicoid thread, at the end of the sliding contact surface thereof.

2. A lens barrel according to claim 1, wherein each of the helicoid female thread and the helicoid male thread that are threaded with each other is arranged as multiple helicoid threads.

3. A lens barrel according to claim 2, wherein the pin member has a shaft portion implanted in one of the first frame and the second frame, and the shaft portion has an edge formed around the circumferential surface thereof.

4. A lens barrel according to claim 1, wherein the pin member has a shaft portion that is implanted in one of the first frame and the second frame, and the shaft portion has an edge formed around the circumferential surface thereof.

5. A lens barrel comprising:
a first frame including a helicoid female thread;
a second frame including a helicoid male thread that is threaded with the helicoid female thread; and
a pin member disposed in any one of the first frame and the second frame,
wherein the pin member has a taper portion that fits in a concave thread portion of the helicoid thread that is threaded with the helicoid thread of the frame in which the pin member is disposed.

6. A lens barrel according to claim 5, wherein the taper portion of the pin member has an edge, which can bite into the flank surface of the helicoid thread, around the circumference on the large diameter side thereof.

7. A lens barrel according to claim 6, wherein the pin member is disposed at a midpoint in a convex thread string of the helicoid thread.

8. A lens barrel according to claim 6, wherein the pin member is disposed between convex thread portions of the helicoid thread.

9. A lens barrel according to claim 6, wherein the pin member is disposed in a concave thread portion of the helicoid thread.

10. A lens barrel according to claim 6, wherein each of the helicoid female thread and the helicoid male thread that are threaded with each other is arranged as multiple helicoid threads.

11. A lens barrel according to claim 6, wherein the taper portion of the pin member comes into contact with the flank surface of the helicoid thread through only the edge thereof.

12. A lens barrel according to claim 6, wherein the helicoid female thread is threaded with the helicoid male thread through a gap defined therebetween within a range in which they have a thread function.

13. A lens barrel comprising:
a first frame including a helicoid female thread;
a second frame including a helicoid male thread that is threaded with the helicoid female thread; and
a pin member disposed in any one of the first frame and the second frame,
wherein the pin member has a taper portion that fits between convex thread portions of the helicoid thread which is threaded with the helicoid thread of the frame in which the pin member is disposed.

14. A lens barrel according to claim 13, wherein the taper portion of the pin member has an edge, which can bite into the flank surface of the helicoid thread, around the circumference on the large diameter side thereof.

15. A lens barrel according to claim 14, wherein the pin member is disposed at a midpoint in a convex thread string of the helicoid thread.

16. A lens barrel according to claim 14, wherein the pin member is disposed between convex thread portions of the helicoid thread.

17. A lens barrel according to claim 14, wherein the pin member is disposed in a concave thread portion of the helicoid thread.

18. A lens barrel according to claim 14, wherein each of the helicoid female thread and the helicoid male thread that are threaded with each other is arranged as multiple helicoid threads.

19. A lens barrel according to claim 14, wherein the taper portion of the pin member comes into contact with the flank surface of the helicoid thread through only the edge thereof.

20. A lens barrel according to claim 14, wherein the helicoid female thread is threaded with the helicoid male thread through a gap defined therebetween within a range in which they have a thread function.

21. A lens barrel comprising:
a first frame including a helicoid female thread;
a second frame including a helicoid male thread that is threaded with the helicoid female thread, and further a pin member having a sliding contact surface that abuts and comes into sliding contact with the flank surface of the helicoid female thread, and the pin member having an edge, which can bite into the flank surface of the helicoid female thread, at the end of the sliding contact surface thereof.

22. A lens barrel comprising:
a first frame comprising a helicoid male thread;
a second frame comprising a helicoid female thread that is threaded with the helicoid male thread, and further a pin member having a sliding contact surface that abuts and comes into sliding contact with the flank surface of the helicoid male thread, and the pin having an edge, which can bite into the flank surface of the helicoid male thread, at the end of the sliding contact surface thereof.

* * * * *